United States Patent
Wise et al.

(10) Patent No.: US 11,116,209 B2
(45) Date of Patent: Sep. 14, 2021

(54) POLYMERIC COMPOSITE-PESTICIDE PLUGS AND RELATED METHODS

(71) Applicant: BOARD OF TRUSTEES OF MICHIGAN STATE UNIVERSITY, East Lansing, MI (US)

(72) Inventors: John C. Wise, Bath, MI (US); Christine VanderVoort, East Lansing, MI (US); Charles Coslor, Lansing, MI (US); Laurent Matuana, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 16/493,465

(22) PCT Filed: Mar. 13, 2018

(86) PCT No.: PCT/US2018/022097
§ 371 (c)(1),
(2) Date: Sep. 12, 2019

(87) PCT Pub. No.: WO2018/169904
PCT Pub. Date: Sep. 20, 2018

(65) Prior Publication Data
US 2020/0128820 A1    Apr. 30, 2020

Related U.S. Application Data

(60) Provisional application No. 62/471,006, filed on Mar. 14, 2017.

(51) Int. Cl.
*A01N 25/34* (2006.01)
*A01N 25/10* (2006.01)
*A01N 43/50* (2006.01)
*A01N 43/90* (2006.01)
*A01N 59/26* (2006.01)

(52) U.S. Cl.
CPC ............ *A01N 25/34* (2013.01); *A01N 25/10* (2013.01); *A01N 43/50* (2013.01); *A01N 43/90* (2013.01); *A01N 59/26* (2013.01)

(58) Field of Classification Search
CPC ........ A01N 25/34; A01N 25/10; A01N 43/50; A01N 43/90; A01N 59/26
See application file for complete search history.

(56) References Cited

U.S. PATENT DOCUMENTS

| | | | |
|---|---|---|---|
| 5,526,607 A | 6/1996 | Roesch et al. | |
| 5,914,295 A | 6/1999 | Hoffmann et al. | |
| 6,001,382 A | 12/1999 | Levy | |
| 6,063,393 A | 5/2000 | Tsubol et al. | |
| 6,216,388 B1 | 4/2001 | Miller et al. | |
| 2001/0039248 A1 | 11/2001 | Podszun et al. | |
| 2003/0198659 A1 | 10/2003 | Hoffmann et al. | |
| 2006/0254123 A1 | 11/2006 | Su | |
| 2008/0269377 A1 | 10/2008 | Matuana | |
| 2011/0275520 A1 | 11/2011 | Frey et al. | |

FOREIGN PATENT DOCUMENTS

JP   2007-284429 A   11/2007

OTHER PUBLICATIONS

International Application No. PCT/US2018/022097, International Search Report and Written Opinion, dated May 23, 2018.
Wise et al., Trunk Injection: A Discriminating Delivering System for Horticulture Crop IPM, Entomol Ornithol Herpetol, 3:126. doi:10.4172/2161-0983.1000126 (2014).
Peltola et al., Wood based PLA and PP composites: Effect of fibre type and matrix polymer on fibre morphology, dispersion and composite properties, Composites Part A: Applied Science and Manufacturing, vol. 61, pp. 13-22 (Jun. 1, 2014).
Zafar et al., Biocomposites based on poly(lactic acid)/willow-fiber and their injection moulded microcellular foams, Express Polymer Letters, 10(2):176-186 (Jan. 1, 2016).
European Patent Application No. 18767439.5, Extended European Search Report, dated Dec. 11, 2020.

*Primary Examiner* — Robert A Wax
*Assistant Examiner* — Olga V. Tcherkasskaya
(74) *Attorney, Agent, or Firm* — Marshall, Gerstein & Borun LLP

(57) ABSTRACT

The disclosure relates to a slow-release biodegradable composite pesticide plug that can be used for trunk injection delivery of pesticides to protect woody plants such as trees (e.g., fruit trees) against pests. The composite pesticide plug generally includes a thermoplastic polymer matrix with a water-soluble thermoplastic polymer component, a cellulosic reinforcement, and a pesticide or other active ingredient. After injection into the tree trunk, the composite pesticide plug provides a uniform, relatively consistent dose of pesticide or other active ingredient to all parts of the tree throughout the growing season, thus reducing waste of material and cost. The biodegradable nature of the composite plug also enhances the healing of the tree after injection.

25 Claims, 5 Drawing Sheets

POLYMERIC COMPOSITE-PESTICIDE PLUGS AND RELATED METHODS

CROSS REFERENCE TO RELATED APPLICATION

This application is a US national stage of PCT/US18/22097, which claims the benefit of U.S. Provisional Application 62/471,006 filed on Mar. 14, 2017, which are incorporated herein by reference in their entirety.

STATEMENT OF GOVERNMENT INTEREST

None.

BACKGROUND OF THE DISCLOSURE

Field of the Disclosure

The disclosure relates to a slow-release biodegradable composite pesticide plug that can be used for trunk injection delivery of pesticides to protect woody plants (e.g., trees) against pests. The composite pesticide plug generally includes a thermoplastic polymer matrix with a water-soluble thermoplastic polymer component, a cellulosic reinforcement, and a pesticide. After injection into the tree trunk, the composite pesticide plug provides a uniform dose of pesticide throughout the growing season.

Background

Tree fruit producers currently reply upon airblast ground sprayers to deliver pesticides to their orchards to control insect and disease pests. Unfortunately, airblast sprayers are a relatively inefficient means of delivering pesticides to their target, with only 29 to 56% of the applied spray solution being deposited on the tree canopy, and the remaining product drifting to ground or other off-target end points. Pest management inputs comprise 30% or more of the total annual variable costs in fruit production and they significantly influence marketable yield. Trunk injection represents an alternate technology for the delivery of pesticides to tree fruit crops. Arborists have developed a variety of techniques for injecting pesticides directly into tree trunks, which then can be translocated from the injection site to the canopy area of insect feeding or disease infection. This technology has been successfully used in protecting ash trees from the Emerald ash borer (EAB) in urban and suburban landscapes because of minimal risks of applicator exposure, drift and impacts on non-target organisms, and superior duration of control compared to foliar application.

Figure 1:
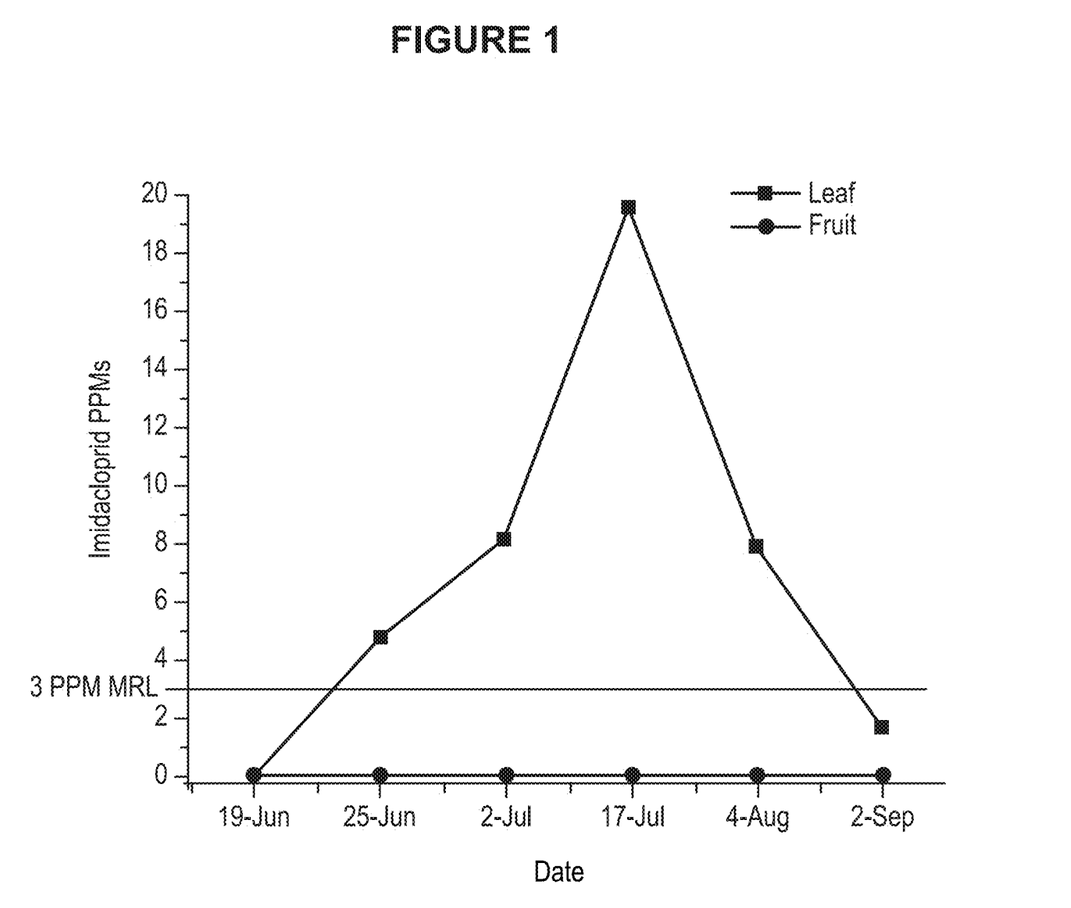
FIG. 1 includes a graph showing a seasonal residue profile of imidacloprid concentration (ppm) in apple fruit (circles; low concentrations) and leaves (squares; spiking concentrations) with a 3 ppm MRL (maximum residue limit or, equivalently known as a tolerance by the U.S. Environmental Protection Agency), resulting from a 4 ml/DFH (diameter at foot height) trunk injection of IMAJET on June 18.

The commercial injection system, sold under the name ARBORJET QUIK-JET, relies upon drilling a hole in the trunk, and injecting a pesticide solution into the cavity, after which the xylem translocates the material to the tree canopy. The commercial injection product, sold under the name ARBORSYSTEMS WEDGLE, drills a shallow hole into the tree trunk, and then makes a pressure injection of liquid solution into the cambial zone of the trunk. These types of injection techniques result in a temporally variable residue profile in the tree canopy, resulting in unnecessarily high doses of insecticide (Wise et al. (2014); see FIG. 1). Another trunk injection technology, sold under the name ACECAP Systemic Insecticide Tree Implant, inserts a capsule containing the pesticide into the tree trunk. After the pesticide is released, however, the capsule remains as a contaminant that hinders tree healing. Both of these commercial systems can cause unacceptable injury to the tree trunk, thus hindering potential adoption in the tree fruit industry. The commercial pesticide product, sold under the name BITE-IN-FUSION, avoids drilling large holes in the tree by slowly infusing the pesticide into the trunk with a needle-based system and pressure. This system can require an inordinate amount of time to inject a single tree, thus lower its potential for use in a tree fruit orchard system.

Accordingly, it would be desirable to provide a uniform dose of pesticide active ingredient to the tree throughout the growing season in a time- and labor-efficient manner which also enhances the healing of the tree after injection.

SUMMARY

In one aspect, the disclosure relates to a composite pesticide plug comprising: (a) a thermoplastic polymer matrix comprising: (a1) a water-soluble thermoplastic polymer, and (a2) a biodegradable thermoplastic polymer; (b) a cellulosic reinforcement distributed throughout the thermoplastic polymer matrix; and (c) a pesticide. In an embodiment, the thermoplastic polymer matrix is free from polymers (or thermoplastic polymers) other than one or more water-soluble thermoplastic polymers and one or more biodegradable thermoplastic polymers.

In another aspect, the disclosure relates to a composite plug for delivery of one or more active materials to internal tree tissue, the composite plug comprising: (a) a thermoplastic polymer matrix comprising: a water-soluble thermoplastic polymer; (b) a cellulosic reinforcement distributed throughout the thermoplastic polymer matrix; and (c) one or more active materials for delivery to internal tree tissue, for example one or more plant protection materials. In an embodiment, the thermoplastic polymer matrix can further comprise a biodegradable thermoplastic polymer. In another embodiment, the plant protection material can be selected from the group consisting of pesticides, biopesticides, plant growth regulators, fertilizers, and combinations (e.g., mixtures) thereof. Any of the various refinements relating to composite pesticide plugs as disclosed herein more generally can apply to the composite plug for delivery of one or more active materials.

In another aspect, the disclosure relates to a composite pesticide plug comprising: (a) a thermoplastic polymer matrix as a continuous phase for the composite pesticide plug, the thermoplastic polymer matrix comprising: (a1) a water-soluble thermoplastic polymer comprising poly(vinyl alcohol) (PVOH), and (a2) a biodegradable thermoplastic polymer comprising poly(lactic acid) (PLA); (b) a cellulosic reinforcement distributed throughout the thermoplastic polymer matrix, the cellulosic reinforcement comprising wood flour; and (c) a pesticide; wherein: (i) the biodegradable thermoplastic polymer is present in the composite pesticide plug in an amount ranging from 15 wt. % to 40 wt. % relative to the combined amount of the thermoplastic polymer matrix and the cellulosic reinforcement; (ii) the water-soluble thermoplastic polymer is present in the composite pesticide plug in an amount ranging from 5 wt. % to 25 wt. % relative to the combined amount of the thermoplastic polymer matrix and the cellulosic reinforcement; (iii) a ratio of the biodegradable thermoplastic polymer to the water-soluble thermoplastic polymer in the composite pesticide plug ranges from 1.2 to 2.5; (iv) the cellulosic reinforcement is present in the composite pesticide plug in an amount ranging from 40 wt. % to 80 wt. % relative to the combined amount of the thermoplastic polymer matrix and the cellulosic reinforcement; and (v) the pesticide is present in the composite pesticide plug in an amount ranging from 1 wt. % to 50 wt. % relative to the combined amount of the thermoplastic polymer matrix and the cellulosic reinforcement.

Various refinements and embodiments of the disclosed composite pesticide plug (or composite plug for delivery of an active ingredient more generally) are possible.

In a refinement, the water-soluble thermoplastic polymer is selected from the group consisting of poly(vinyl alcohol) (PVOH), polyacrylates, polymethacrylates, water-soluble (meth)acrylate copolymers, polyvinyl pyrrolidones, polyethyleneimines, polyalkylene oxides, polyacrylic acids and salts thereof, and combinations thereof. In another refinement, the water-soluble thermoplastic polymer comprises poly(vinyl alcohol) (PVOH). In another refinement, the water-soluble thermoplastic polymer is present in the composite pesticide plug in an amount ranging from 5 wt. % to 40 wt. % relative to the combined amount of the thermoplastic polymer matrix and the cellulosic reinforcement.

In a refinement, the biodegradable thermoplastic polymer comprises a biodegradable thermoplastic polyester. In another refinement, the biodegradable thermoplastic polymer is selected from the group consisting of poly(lactic acid) (PLA), a poly(hydroxyalkanoate) (PHA), a poly(lactone), and combinations thereof. In another refinement, the biodegradable thermoplastic polymer comprises poly(lactic acid) (PLA). In another refinement, the biodegradable thermoplastic polymer is present in the composite pesticide plug in an amount ranging from 10 wt. % to 50 wt. % relative to the combined amount of the thermoplastic polymer matrix and the cellulosic reinforcement. In another refinement, a ratio of the biodegradable thermoplastic polymer to the water-soluble thermoplastic polymer in the composite pesticide plug ranges from 1 to 3.

In a refinement, the cellulosic reinforcement is selected from the group consisting of wood flour, wood fibers, wood chips, wood flakes, and combinations thereof. In another refinement, the cellulosic reinforcement comprises wood flour. In another refinement, the cellulosic reinforcement is present in the composite pesticide plug in an amount ranging from 30 wt. % to 85 wt. % relative to the combined amount of the thermoplastic polymer matrix and the cellulosic reinforcement.

In a refinement, the pesticide is selected from the group consisting of neonicotinoids, avermectins, azadirachtin, diamides, sterol inhibitors, oxytetracycline, phosphorous acid, derivatives thereof, and combinations thereof. In another refinement, the pesticide is homogeneously distributed throughout the thermoplastic polymer matrix. In another refinement, the pesticide has a water solubility of at least 0.1 g/L. In another refinement, the pesticide has a water solubility of less than 0.1 g/L. In another refinement, the pesticide is present in the composite pesticide plug in an amount ranging from 1 wt. % to 50 wt. % relative to the combined amount of the thermoplastic polymer matrix and the cellulosic reinforcement.

In a refinement, the plug has an elongate geometry.

In another aspect, the disclosure relates to a method for delivering a pesticide or other active ingredient to a tree, the method comprising: inserting the composite (pesticide) plug according to any of its variously disclosed embodiments into an interior trunk region of a live tree.

Various refinements and embodiments of the disclosed method for delivering a pesticide or other active ingredient to a tree are possible.

In a refinement, the method comprises inserting the composite (pesticide) plug at a height ranging from 0.1 m to 1 m above the ground. In another refinement, the method comprises inserting a plurality of the composite (pesticide) plugs distributed circumferentially around the tree trunk. In another refinement, the tree is a fruit tree selected from the group consisting of apple trees, cherry trees, grapefruit trees, lemon trees, lime trees, nectarine trees, orange trees, peach trees, pear trees, plum trees, and pomegranate trees.

While the disclosed articles, compounds, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

FIG. 3 includes graphs showing (A) lab dissipation studies (% imidacloprid released from plug vs. days after test start) and (B) field residue profiles in apple trees (ng imidacloprid/g leaf material vs. days after treatment) for various tests of commercial injection techniques, the MSU 01-15 (60:25:15 Wood:PLA:PVOH) composite pesticide plug, the MSU 02-13 (72.5:27.5 Wood:PLA) composite pesticide plug, and the MSU 01-14 (30:70 Wood:PVOH) composite pesticide plug including imidacloprid.

FIG. 4 includes graphs showing (A) lab dissipation studies (% emamectin benzoate released from plug vs. days after test start) and (B) field residue profiles in apple trees (ng emamectin benzoate/g leaf material vs. days after treatment) for various tests of commercial injection techniques, the MSU 01-15 (60:25:15 Wood:PLA:PVOH) composite pesticide plug, the MSU 02-13 (72.5:27.5 Wood:PLA) composite pesticide plug, and the MSU 01-14 (30:70 Wood:PVOH) composite pesticide plug including emamectin benzoate.

FIG. 5 includes graphs showing field residue profiles in apple trees (ppm of pesticide in leaf material vs. days after treatment) for tests of commercial injection techniques and the MSU 01-16 (60:40 Wood:PVOH) composite pesticide plug including emamectin benzoate (panel (A)) or imidacloprid (panel (B)) as the pesticide. Injections for the MSU 01-16 composite pesticide plugs were performed at either the tight cluster (TC) or petal fall (PF) growing stages.

DETAILED DESCRIPTION

The disclosure relates to a slow-release biodegradable composite pesticide plug that can be used for trunk injection delivery of pesticides to protect woody plants (e.g., trees and fruit trees in particular) against pests. The composite pesticide plug generally includes a thermoplastic polymer matrix with a water-soluble thermoplastic polymer component, a cellulosic reinforcement, and a pesticide (e.g., an extruded polylactic acid (PLA)-polyvinyl alcohol (PVOH)-wood flour-pesticide composite plug). After injection into the tree trunk, the composite pesticide plug provides a uniform, relatively consistent dose of active ingredient (e.g., pesticide or otherwise) to all parts of the tree throughout the growing season, thus reducing waste of material and cost. The biodegradable nature of the composite plug also enhances the healing of the tree after injection.

Composite Pesticide Plug

A composite pesticide plug according to the disclosure generally includes a thermoplastic polymer matrix with a water-soluble thermoplastic polymer component and preferably a biodegradable thermoplastic polymer component (e.g., as two different types of polymeric components), a cellulosic reinforcement, and a pesticide. The thermoplastic polymer matrix generally forms a continuous phase for the composite pesticide plug. When two or more thermoplastic polymers are used for the thermoplastic polymer matrix (e.g., the water-soluble thermoplastic polymer, the biodegradable thermoplastic polymer, and any other optional thermoplastic polymers included), they generally form a miscible blend as a continuous, homogeneous polymeric phase. The cellulosic reinforcement is distributed throughout the thermoplastic polymer matrix, for example as discrete, heterogeneous particles essentially evenly distributed throughout the continuous phase. The inclusion of the cellulosic reinforcement in a substantial amount in the plug enhances biodegradability of the plug and eventual healing of the tree after injection. The pesticide is generally present in the thermoplastic polymer matrix, for example being homogeneously distributed throughout the thermoplastic polymer matrix.

The water-soluble thermoplastic polymer component may or may not be relatively biodegradable, but it generally contains polar functional groups (e.g., hydroxyl groups, amino groups) that provide it with some degree of water solubility and/or ability to hydrogen-bond with water. Water solubility and/or hydrogen bonding facilitate release of the pesticide and delivery of the same throughout the tree. When exposed to water transport in xylem tissue (and optionally phloem tissue), the water can solubilize the water-soluble thermoplastic polymer, thus releasing the pesticide from the plug. Water-based xylem transport (and to some extent phloem transport) can then deliver the released pesticide (e.g., along with the water-soluble thermoplastic polymer) to various plant tissues including the trunk (e.g., at or above locations where the plug is injected), branches (e.g., scaffold branches, lateral branches), stems, leaves, etc. The biodegradable thermoplastic polymer is generally relatively water-insoluble (e.g., relative to the water-soluble thermoplastic polymer), and it provides some additional structural integrity to the matrix relative to the water-soluble thermoplastic polymer. Its biodegradable nature assists in eventual tree healing after plug injection, and its water-insoluble nature limits the amount of polymer material carried away via xylem transport. Too high of a water-soluble thermoplastic polymer content in the plug could lead to correspondingly high concentrations of the water-soluble thermoplastic polymer in the xylem tissue after release, possibly resulting in deposition of solid water-soluble thermoplastic polymer in the xylem tissue. Such deposits can obstruct further delivery of pesticide and limit the effectiveness of the plug's controlled release properties.

The water-soluble thermoplastic polymer is not particularly limited and can include, for example, thermoplastic polymers (e.g., having a hydrocarbon or hydrocarbon-containing backbone) with one or more polar functional units such as hydroxyl groups, amino groups, carboxylic/carboxylate groups (e.g., acrylic/acrylate groups), and alkylene oxide repeat units. Examples of suitable water-soluble thermoplastic polymers include poly(vinyl alcohol) (PVOH), polyacrylates, polymethacrylates, water-soluble (meth)acrylate copolymers, polyvinyl pyrrolidones, polyethyleneimines, polyalkylene oxides, polyacrylic acids and salts thereof, and combinations thereof (e.g., polymer blends and/or copolymers of the respective monomers). PVOH is a particularly suitable water-soluble thermoplastic polymer. PVOH can include partially or completely hydrolyzed poly(vinyl acetate) with at least some vinyl alcohol repeat units and optionally some vinyl acetate repeat units, and it further can include copolymers with monomers of other than vinyl alcohol and vinyl acetate repeat units.

The amount of the water-soluble thermoplastic polymer incorporated into the composite pesticide plug is not particularly limited. In various embodiments, the water-soluble thermoplastic polymer is present in the composite pesticide plug in an amount ranging from 5 wt. % to 40 wt. % relative to the combined amount of the thermoplastic polymer matrix and the cellulosic reinforcement. The water-soluble thermoplastic polymer amount can include all water-soluble thermoplastic polymer species combined when there is more than one type in the plug. The relevant weight basis for the water-soluble thermoplastic polymer amount includes thermoplastic polymers (e.g., water-soluble and/or biodegradable thermoplastic polymers) and cellulosic reinforcement(s), but excludes the pesticide component and any other optional additives or components in the plug. More generally, the amount of the water-soluble thermoplastic polymer in the composite pesticide plug can be at least 2, 5, 10, or 15 wt. % and/or up to 10, 20, 25, 30, 40, or 50 wt. %.

The biodegradable thermoplastic polymer is not particularly limited and can include, for example, biodegradable thermoplastic polyesters, polyamides, polyethers, copolymers thereof, mixtures thereof, etc. Examples of suitable biodegradable thermoplastic polymers include polyesters such as poly(lactic acid) (PLA), a poly(hydroxyalkanoate) (PHA), a poly(lactone), and combinations thereof (e.g., polymer blends and/or copolymers of the respective monomers). A poly(hydroxyalkanoate) can be a polymer polymerized from a HO—R1-C(=O)OH monomer and/or including a —O—R1-C(=O)— repeat unit, where R1 is a linear or branched alkyl (or alkylene) group with 3 or more carbon atoms (e.g., at least 3 or 4 carbon atoms and/or up to 6, 8, or 10 carbon atoms). Examples of poly(hydroxyalkanoates) include poly-3-hydroxyvalerate (PHV), poly-4-hydroxybutyrate (P4HB), poly-3-hydroxybutyrate (P3HB), poly(3-hydroxybutyrate-co-3-hydroxyvalerate) (PHBV)). A poly(lactone) can be a polymer polymerized from a —O—R2-C(=O)— cyclic ester monomer and/or including a —O—R2-C(=O)— repeat unit, where R2 is a linear alkyl (or alkylene) group with 1 or more carbon atoms (e.g., at least 2 or 4 carbon atoms and/or up to 5, 6, 8, or 10 carbon atoms). Examples of poly(lactones) include polyvalerolactone (PCL) and polycaprolactone (PCL)).

The amount of the biodegradable thermoplastic polymer incorporated into the composite pesticide plug is not particularly limited. In various embodiments, the biodegradable thermoplastic polymer is present in the composite pesticide plug in an amount ranging from 10 wt. % to 50 wt. % relative to the combined amount of the thermoplastic polymer matrix and the cellulosic reinforcement. The biodegradable thermoplastic polymer amount can include all biodegradable thermoplastic polymer species combined when there is more than one type in the plug. The relevant weight basis for the biodegradable thermoplastic polymer amount includes thermoplastic polymers (e.g., water-soluble and/or biodegradable thermoplastic polymers) and cellulosic reinforcement(s), but excludes the pesticide component and any other optional additives or components in the plug. More generally, the amount of the biodegradable thermoplastic polymer in the composite pesticide plug can be at least 5, 10, 15, or 20 wt. % and/or up to 10, 20, 30, 40, 50, or 60 wt. %.

In various embodiments, the ratio of the biodegradable thermoplastic polymer to the water-soluble thermoplastic polymer in the composite pesticide plug ranges from 1 to 3 (e.g., at least 1, 1.2, 1.4 or 1.5 and/or up to 1.5, 2, 2.5, or 3). As described above, some water-soluble thermoplastic polymer is desirable to assist with plug dissolution, pesticide release, and water-based transport of the pesticide in the tree, but too much water-soluble thermoplastic polymer could block internal tree passages (e.g., xylem and/or phloem tissue) and inhibit pesticide delivery. The biodegradable thermoplastic polymer provides additional material which helps to form the thermoplastic matrix for the composite, but which is also biodegradable in place where it inserted (e.g., without potentially blocking downstream water transport tissue).

The cellulosic (or wood) reinforcement may be from any suitable source, for example a wood material or other lignocellulosic material. Suitable examples of the cellulosic reinforcement include fiber, chip, flake, flour (e.g., sawdust or powder from a hardwood or a softwood, for example cedar, pine, maple, oak, ash, and/or spruce), etc. The cellulosic reinforcement is preferably a dried wood flour (e.g., having particle sizes between about 1 µm to about 1,000 µm, such as less than about 850 µm or a 20-mesh-pass size, less than about 500 µm or a 40-mesh-pass size, etc.), for example being dried in an oven for 24-48 hrs at 105° C. to a moisture content of less than 1% before compounding and processing. Moisture can also be removed by venting during processing. The cellulosic reinforcement can be derived from virgin wood fibers or waste wood byproducts (e.g., urban and demolition wood waste, wood trim pieces, wood milling by-products, pellets, paper pulp, sawdust, scrap paper/newspaper). Wood waste originated from plywood, particle board, medium density fiberboard, and CCA-treated timber (i.e., chromated copper arsenate) may also be used. The cellulosic reinforcement can be derived from other lignocellulosic materials, for example leaves and fruit peels (e.g., orange or other citrus fruit peels, apple peels). Other suitable cellulosic reinforcements include natural fibers from lignocellulosic materials such as flax, bagass, jute, hemp, sisal, cotton, ramie, coir, straw and the like. The cellulosic reinforcements may vary greatly in size, shape, particles size distribution, and aspect ratio (e.g., chips, flours, flakes, fibers). For example, cellulosic reinforcements can have a microscale size, for example having particle sizes ranging from 1 µm to about 1,000 µm (e.g., at least 1 µm or 10 µm and/or up to 500 µm, 850 µm, or 1,000 µm). In other embodiments, cellulosic reinforcements can have a nanoscale size, for example having particle sizes ranging from 1 nm to about 1,000 nm (e.g., at least 1 nm, 5 nm, 10 nm, or 20 nm and/or up to 50 nm, 100 nm, 200 nm, 500 nm, or 1,000 nm). Examples of suitable nanoscale cellulosic reinforcements include cellulosic nanomaterials, which can be extracted from lignocellulosic materials by known mechanical and/or chemical methods. Cellulosic nanocrystals can have an approximate spherical shape or irregular shape with a low aspect ratio, and cellulosic nanofibers can have a high aspect ratio with a nanoscale diameter and a microscale length. A suitable cellulosic reinforcement includes a softwood pine wood flour. Pine wood flour and other relatively porous wood flours are particularly suitable for polymer blending.

The amount of cellulosic reinforcement incorporated into the composite pesticide plug is not particularly limited. In various embodiments, the amount of the cellulosic reinforcement in the composite pesticide plug ranges from 30 wt. % to 85 wt. % relative to the combined amount of the thermoplastic polymer matrix and the cellulosic reinforcement. The cellulosic reinforcement amount can include all cellulosic reinforcement species combined when there is more than one type in the plug. The relevant weight basis for the cellulosic reinforcement amount includes thermoplastic polymers (e.g., water-soluble and/or biodegradable thermoplastic polymers) and cellulosic reinforcement(s), but excludes the pesticide component and any other optional additives or components in the plug. More generally, the amount of the cellulosic reinforcement in the composite pesticide plug can be at least 30, 40, 50, or 60 wt. % and/or up to 50, 60, 65, 70, 80, or 85 wt. % relative to the combined amount of the thermoplastic polymer matrix and the cellulosic reinforcement.

The pesticide is not particularly limited and can include any pesticides (e.g., insecticides, fungicides, miticides and/or antibiotics used for tree health) that target one or more tree pests and that are compatible with xylem (and optionally phloem) transport with a target tree. Xylem tissue within the tree trunk, branches (e.g., scaffold branches, lateral branches), stems, leaves, etc. provides a transport path for water from the roots, through the trunk, branches, stems, etc., and to the leaves. Naturally transported water through the xylem tissue provides a vehicle for transport and delivery of the pesticide in combination with the water-soluble thermoplastic polymer from the plug. Similarly, phloem tissue within the tree provides transport for water-soluble sugars and can assist in pesticide delivery as well. Suitable classes of pesticides include neonicotinoids, avermectins, azadirachtin, diamides (e.g., diamide insecticides), sterol inhibitors (e.g., sterol inhibitor fungicides), oxytetracycline (e.g., a tetracycline group antibiotic), phosphorous acid, derivatives thereof, and combinations or mixtures thereof. Example derivative forms include salts such as metal salts (e.g., alkali and/or alkali earth metal salt) and amine salts (e.g., as mono-, di-, or tri-alkyl or alkanol amine; amine salt with a halogen such as chloride or a carboxylate such as benzoate), esters (e.g., alkyl esters), and amides. Example neonicotinoids include acetamiprid, clothianidin, imidacloprid, nitenpyram, nithiazine, thiacloprid, and thiamethoxam. Example avermectins include ivermectin, selamectin, doramectin, abamectin, and emamectin (a 4"-deoxy-4"-methylamino derivative of abamectin, such as in the form of a benzoic acid amine salt). Example diamides include broflanilide, cyantraniliprole, flubendiamide, and chlorantraniliprole. Example sterol inhibitors include triazole fungicides (e.g., tebuconazole, propiconazole), imidazoles (e.g., imazalil), and pyrimidines (e.g., fenarimol).

Although generally described herein for use in combination with and for delivery of a pesticide, the composite plug can more generally include any active ingredient for delivery to internal tree tissue. Examples of such active ingredients can include any of the various plant protection materials know in the art for promoting tree health, such as materials which kill or inactivate tree pests, increase a tree's resistance to pests, and/or promote tree growth, etc. Plant protection materials can include pesticides (e.g., as described above), biopesticides, plant growth regulators, and fertilizers, for example. The composite plug can include multiple different types of plant protection materials, for example two or more plant protection materials of the same or different type (e.g., two different types of pesticide, one pesticide and one fertilizer, etc.). Biopesticides are generally known in the art and can target one or more types of tree pests as do pesticides, but they are derived from natural materials such as animals, plants, bacteria, and certain minerals. Plant growth regulators are generally known in the art and can include various synthetic or natural substances that stimulate or otherwise regulate plant growth in a manner or mechanism similar to that of natural plant hormones. Fertilizers, whether specifically tailored for trees specifically or plants more generally, are generally known in the art and can include one or more plant nutrients such as macronutrients (e.g., nitrogen, phosphorus, potassium, calcium, sulfur, and/or magnesium) or micronutrients (e.g., trace minerals such as boron, chlorine, manganese, iron, zinc, copper, molybdenum, nickel, and/or cobalt) desired to supplement the nutrients from the tree's local soil environment. As used herein, description related to pesticides is understood to apply more generally to any active ingredient or plant protection material for inclusion in the composite plug (e.g., present in the thermoplastic polymer matrix such as being homogeneously distributed throughout the matrix).

Compatibility with xylem (and optionally phloem) transport for the pesticide can be a result of pesticide compatibility or miscibility with the water-soluble thermoplastic polymer and/or some degree of water solubility for the pesticide. In such cases, the pesticide is suitable for transport along with the aqueous fluids themselves being transported through the tree's vascular tissue. In some cases, the pesticide is at least partially hydrophilic in character, for example having a relatively high water solubility of at least 0.1 g/L (e.g., at least 0.1, 0.2, 0.5, 1, 2, 5, or 10 g/L and/or up to 10, 20, 50, or 100 g/L (or completely water-soluble)). Such hydrophilic character and/or water solubility can allow direct water dissolution and transport to various tree locations via tree vascular tissue. In some cases, the pesticide is at least partially lipophilic in character, for example having a relatively low water solubility of less than 0.1 g/L (e.g., less than 0.1, 0.01, or 0.001 g/L; essentially water-insoluble). Such lipophilic character can allow transport of relatively sugar-rich fluids (e.g., during sap flow periods for the tree). Even with relatively low water solubility, however, the pesticides can be compatible with xylem transport, for example based on relatively low delivery concentrations (e.g., where low water solubility is less limiting) as well as compatibility with the water-soluble thermoplastic polymer (i.e., which is itself compatible with xylem transport).

The pesticide is suitably homogeneously distributed throughout the thermoplastic polymer matrix of the plug. For example, the pesticide can be present as a miscible blend with the polymeric components of the plug matrix. Most common technical grade pesticides are naturally dry (or solid) materials at ambient room/environmental temperatures, and they can be combined directly in dry form with the other plug components, or they formulated as liquids (e.g., with a suitable solvent) for combination with the other plug components. For example, under common melt-processing conditions for forming the composite plug (e.g., at the melt compounding, mixing, extruding, etc. temperature of the thermoplastic polymers in the plug), the temperature can be sufficient to melt an otherwise solid pesticide and, which then can form a miscible blend with the polymer matrix. For example, as illustrated in the examples below, imidacloprid and emamcetin benzoate insecticides have melting points (MP 136-144° C. for imidacloprid and MP 141-146° C. for emamcetin) below the extrusion/melt blending temperature of the thermoplastic matrix polymers of the composite material; the wood flour, the thermoplastic matrix polymers (PVOH and PLA), and the pesticides have a similar consistency during melt processing and result in a relatively homogeneous composite plug matrix.

The pesticide can be present in any desired concentration in the plug, which concentration is generally guided by manufacturer's instructions and/or regulatory limits for dosage for a particular target tree and/or in a target environment. For example, the pesticide can be present in the composite pesticide plug in an amount ranging from 1 wt. % to 50 wt. % relative to the combined amount of the thermoplastic polymer matrix and the cellulosic reinforcement. The relevant weight basis for the pesticide amount includes thermoplastic polymers (e.g., water-soluble and/or biodegradable thermoplastic polymers) and cellulosic reinforcement(s), but excludes the pesticide component itself and any other optional additives or components in the plug. More generally, the amount of the pesticide in the composite pesticide plug can be at least 1, 2, 3, 5, 10, 15, 20, 30, or 40 wt. % and/or up to 3, 5, 10, 20, 30, 40, or 50 wt. % relative to the combined amount of the thermoplastic polymer matrix and the cellulosic reinforcement. The various pesticide amounts and ranges can represent single pesticide species and/or all pesticide species combined when there is more than one type of (e.g., pesticide amount includes all pesticide species combined when there is more than one type of pesticide in the plug).

The composite pesticide plug can have any desired shape, but it is suitably shaped based on ease of processing and a desire to have a relatively large relative surface area (e.g., surface area/volume or surface area/mass ratio). In some embodiments, the plug has an elongate geometry, which can be suitably formed by extrusion or compression molding as described below and illustrated in the examples. For example, the plug can have a generally cylindrical geometry (e.g., to maximize relative surface area for an elongate or axially symmetric shape), such as having a length (L) of at least 1, 2, 5, 10, 15, or 25 mm and/or up to 10, 20, 30, 50, or 100 mm, and/or having a diameter (D) (or width/equivalent diameter for non-cylinders) of at least 1, 2, 5, or 10 mm and/or up to 5, 8, 10, 15, or 25 mm. The L/D aspect ratio can be at least 1:1 or 2:1 and/or up to 3:1, 4:1, 6:1, or 8:1. The specific geometry/size can be selected to have a desired total volume in terms of amount of active (pesticide) ingredient to be delivered and to have a desired specific surface area (area per unit volume) to control delivery rate. The plug in any form is preferably free from a coating or encapsulating material.

The composite pesticide plug can be formed by any suitable melt compounding method. Generally, the thermoplastic polymer matrix components (e.g., biodegradable thermoplastic polymer, water-soluble thermoplastic polymer; in the form of powder or pellets) and the cellulosic reinforcement are initially dried at an elevated temperature (e.g., 50° C. to 150° C., but lower than the melt temperature of any polymer components). The thermoplastic polymer matrix components, the cellulosic reinforcement, the pesticide (e.g., when in a solid form such as a powder), and any desired other additives (e.g., processing aids or functional components) can be dry mixed in the desired proportions for the final plug. A pesticide in liquid form (e.g., as a solution or suspension) can be added to the dry mixture of the thermoplastic polymer matrix components and the cellulosic reinforcement, or it can be added to the melt for compounding/mixing during plug formation. The dry mixture can be melt blended first and then melt processed into its desired plug shape using any suitable methods, for example including extrusion, compression molding, injection molding, etc. In other embodiments, the dry mixture can be can be melt processed directly into its desired plug shape using any suitable methods as described above.

Method for Pesticide Delivery

The composite pesticide plug according to any of its variously disclosed embodiments can be used to deliver a relatively uniform, consistent amount of its pesticide active component over time to tree tissue at or above the plug's point of insertion into the tree. The water-soluble nature of the water-soluble thermoplastic polymer assists in pesticide release and aqueous delivery of the pesticide via xylem (and optionally phloem) transport. The biodegradable nature of the biodegradable thermoplastic polymer and the cellulosic reinforcement assists in healing of the tree after insertion of the plug. The composite pesticide plug is inserted into an interior region of a live tree (e.g., into the trunk, one or more branches, etc.), and then natural water and/or sap transport within the tree will release and deliver the pesticide from the plug. Inserting the plug can involve drilling a hole in the tree trunk with a diameter generally corresponding to that if the plug and a desired depth, and then inserting the plug into the hole. The manner of plug insertion is not particularly limited, however, and any suitable mechanical means may be used (e.g., a mechanical device or tool that can insert the plug with or without the use of a drill). The length of the plug and its insertion depth into the trunk are generally selected to provide maximum exposure of the plug's outer surface area to active xylem and/or phloem tissues, which are immediately under the bark of the tree. Suitable depths can be determined by the skilled artisan based on the type and size of tree for injection.

The composite pesticide plug is generally inserted into a lower portion of the tree trunk, typically between the ground and the first set of scaffold limbs or branches above the ground. Injection at such point ensures that xylem transport of the pesticide will reach most or essentially all plant tissue above the insertion point, given that xylem transport of water initiates at the roots and travels upwards to the plant tissue extremities. By way of non-limiting example for various common trees of interest, the composite pesticide plug can be inserted at a height ranging from 0.1 m to 1 m above the ground (e.g., a height of at least 0.1 or 0.2 m and/or up to 0.3, 0.5, or 1 m). In apple trees, for example, the first set of scaffold limbs occur at or above about 0.3 m, so an insertion point below 0.3 m is desirable.

For a given tree, multiple composite pesticide plugs are suitably inserted into the tree at multiple positions distributed around the tree trunk (e.g., circumferentially distributed). The total number of plugs for a given tree increases as the trunk diameter increases. Larger trees need more active ingredient because they have more canopy. Xylem is sectored within the tree such that multiple plugs are needed to attain an even distribution of product in the tree canopy. For example, 2, 3, 4, 5, 6, 8, 10, 12, 15, 20, or more plugs can be distributed around the circumference of the tree trunk at approximately even intervals (e.g., at approximately 360°/n intervals where n is the number of plugs).

The types of trees that can be treated with the composite pesticide plug are not particularly limited and can be trees in a cultivated area (e.g., orchard), a nursery, or a wild area (e.g., forest), for example. Suitable types of trees include fruit trees, ornamental trees, forest trees, etc. Examples of specific fruit trees of interest include apple trees, cherry trees, grapefruit trees, lemon trees, lime trees, nectarine trees, orange trees, peach trees, pear trees, plum trees, and pomegranate trees.

EXAMPLES

The following examples illustrate the composite pesticide plugs and related methods for pesticide delivery disclosed herein, but are not intended to be limiting.

Figure 3A:
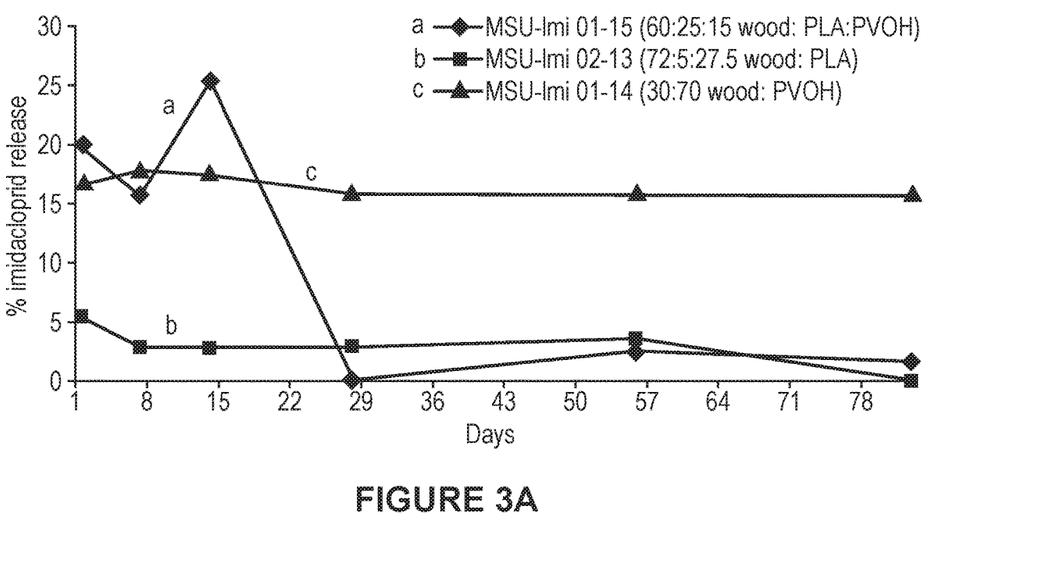
Figure 3B:
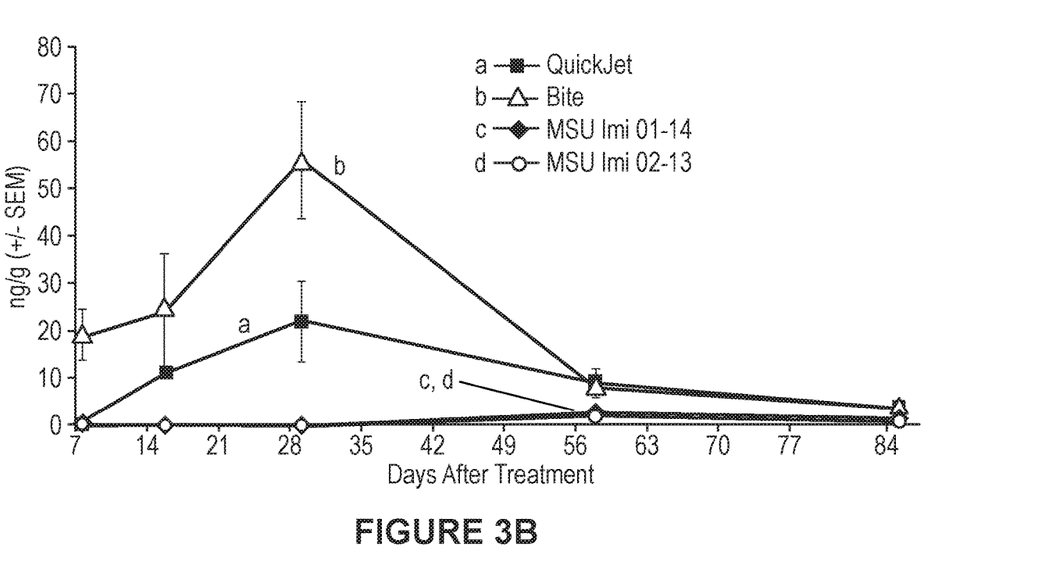
Figure 4A:
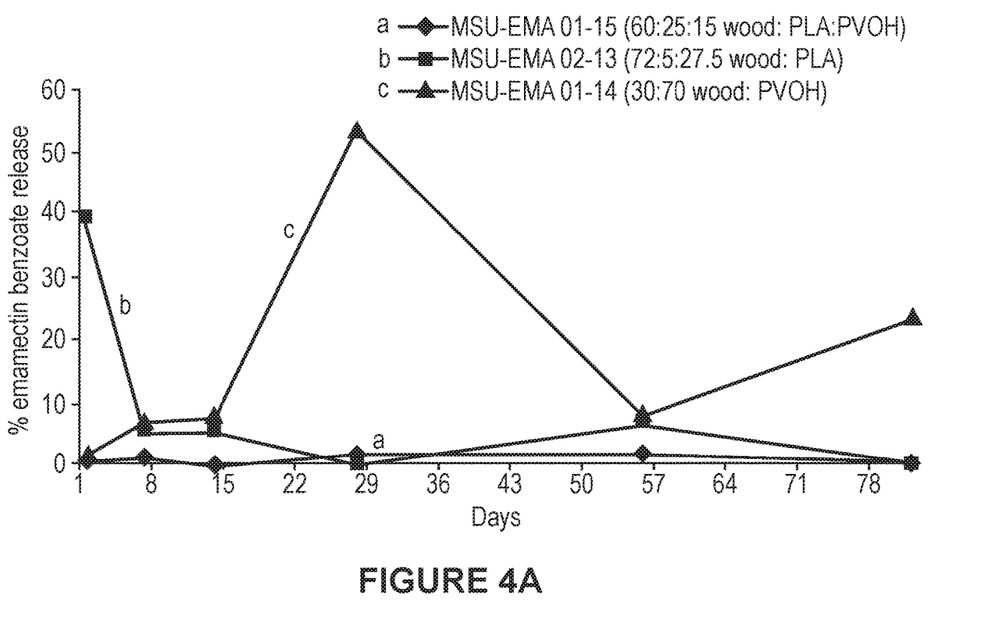
Figure 4B:
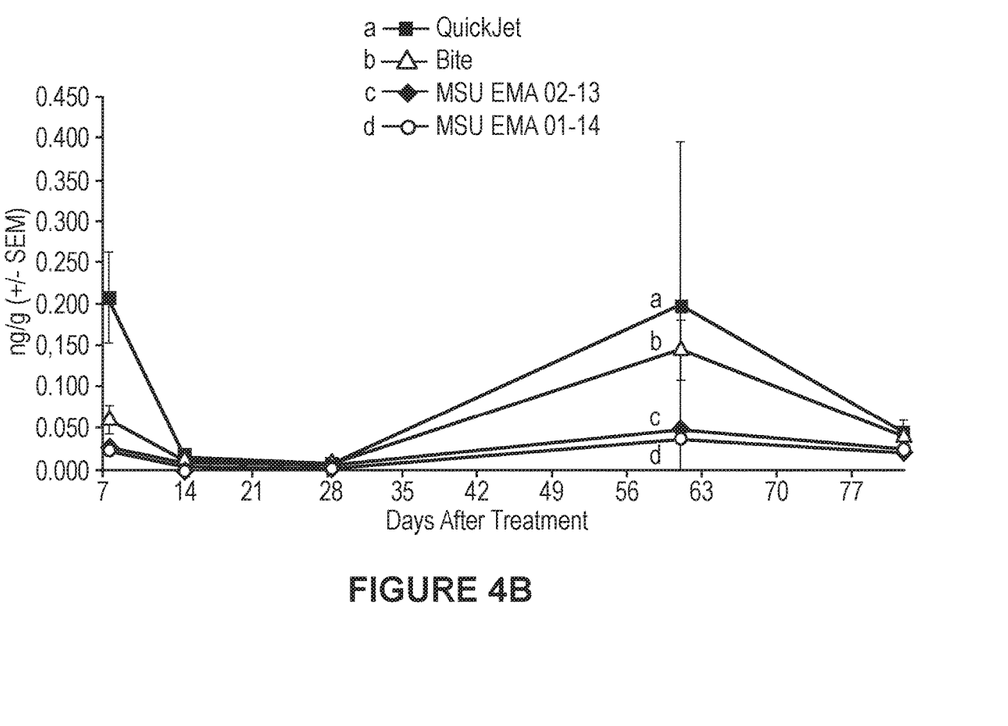
Figure 5A:
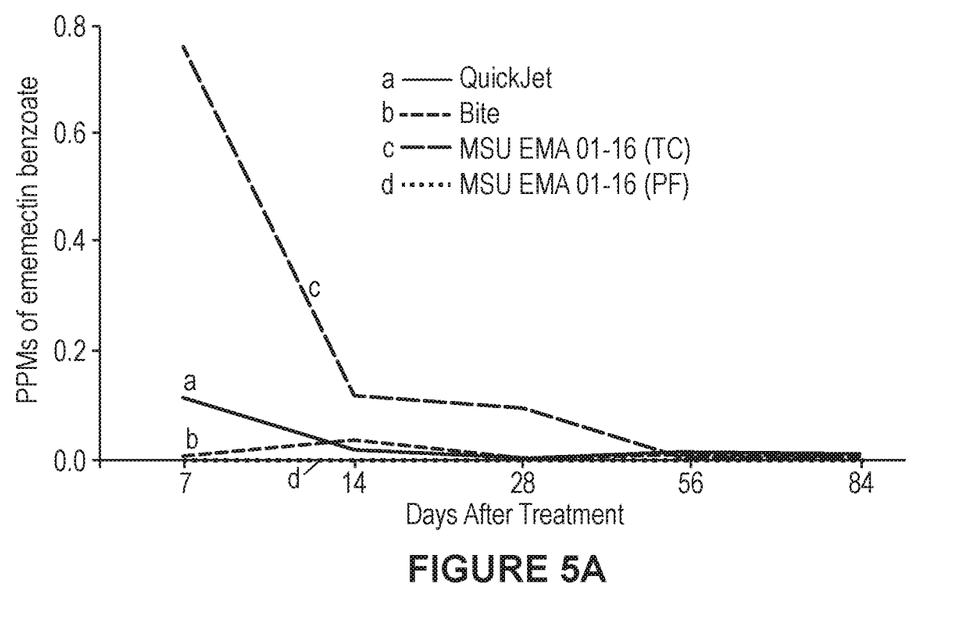
Figure 5B:
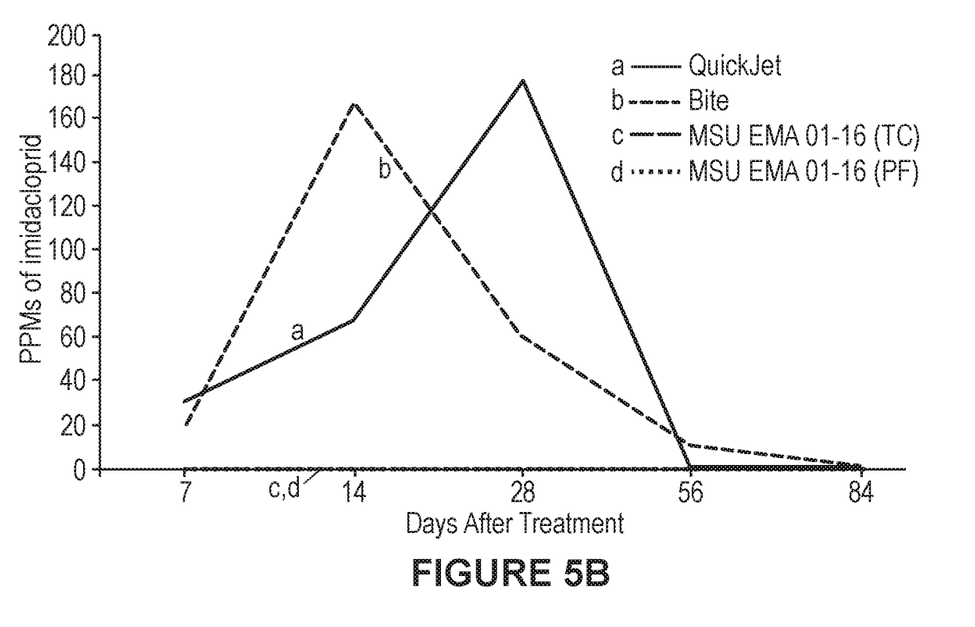

Methods:

Field studies were initiated at the Trevor Nichols Research Center (Michigan State University) to determine the effectiveness of MSU Biodegradable plugs for delivering the insecticides imidacloprid and emamectin benzoate to apple trees canopy foliage, compared to standard liquid formulations with commercial trunk injection tools. Imidacloprid and emamectin benzoate represent a spectrum of insecticides that have been generally effective in commercial trunk injection products, and thus were selected for as representative pesticides for the examples. Imidacloprid has a water solubility of about 510 mg/L with 0.57 Log Kow (octanol/water partition coefficient), and emamectin benzoate has a water solubility of about 24 mg/L with about 5.0 log Kow. Imidacloprid is representative of a relatively high water solubility or hydrophilic pesticide, and emamectin benzoate is representative of a relatively low water solubility or lipophilic pesticide. The insecticides were injected into apple trees at a dose of 0.8 g active ingredient (AI) imidacloprid per tree or 0.08 g AI emamectin benzoate per tree using commercial liquid-injection products, sold under the names ARBORJET QUICKJET and BITE-INFUSION, as comparisons for various example composite pesticide plugs. The composite pesticide plugs were inserted into apple trees to match the total AI per tree as in liquid injections (i.e., 0.8 g AI imidacloprid per tree or 0.08 g AI emamectin benzoate per tree). Trunk injections were made to semi-dwarf Red Delicious apple trees at petal fall stage (FIGS. 2-4), with four injection ports per trunk and approximately 1 foot above the ground, replicated three times. A timing study was conducted where an early season (tight cluster stage) injection was made of the example composite pesticide plugs, to compare with standard petal timings of commercial materials (FIG. 5).

Field residue samples were taken from injected trees for each treatment by collecting leaves 1, 7, 14, 28, 56 and 84 days after treatment (DAT). The leaf samples were a minimum of 40 leaves (±20 g) of tissue collected from the N, S, E, W sides of the tree, high/low and put in labeled jars. They were weighed, put in 90 ml of dichloromethane, and stored in 120 ml sample jars (available from Qorpak, Bridgeville, Pa.) in a refrigerated cold room. After the field season, the samples were taken out of the cold room and analyzed for pesticides via high-pressure liquid chromatography (HPLC) analysis. Compounds were quantitated against a standard curve, and recovery data recorded as nanograms of active ingredient per gram of plant tissue, and compared with performance levels.

For the laboratory dissipation study, one plug was placed in each 120 ml Qorpak sample container and 50 ml of de-ionized water was added to the container and closed. The container was placed on the lab bench for the entire time of sampling. The sampling period was 78 days. Sampling was done in triplicate. On day one after placing plugs in water, the water was removed and a fresh 50 ml of water was added to each sample jar. The 50 ml of water was extracted with 20 ml of acetonitrile, and 4 g $MgSO_4$ and 1 g NaCl were added to the sample. The sample was vortexed for one minute and then centrifuged at 1000 rpm. The supernatant was removed and placed in a round bottom flask and the volume was reduced via rotary evaporation. The sample was brought up in 1 ml of acetonitrile and put in a gas chromatography vial for analysis. This extraction was repeated at 7, 14, 28, 56 and 84 days with fresh water being put in each time. Chemical analysis via HPLC followed same analytical procedures as field samples.

The various tested plug formulations with imidacloprid ("IMI") and emamectin benzoate ("EMA"), which are listed in terms of weight fractions of the non-pesticide components, include sample MSU 03-12 (60:40 wood:PLA), sample MSU 02-13 (72.5:27.5 wood:PLA), sample MSU 01-14 (30:70 wood:PVOH), sample MSU 01-15 (60:25:15 wood:PLA:PVOH), sample MSU 01-16 (60:40 wood: PVOH).

Figure 2:
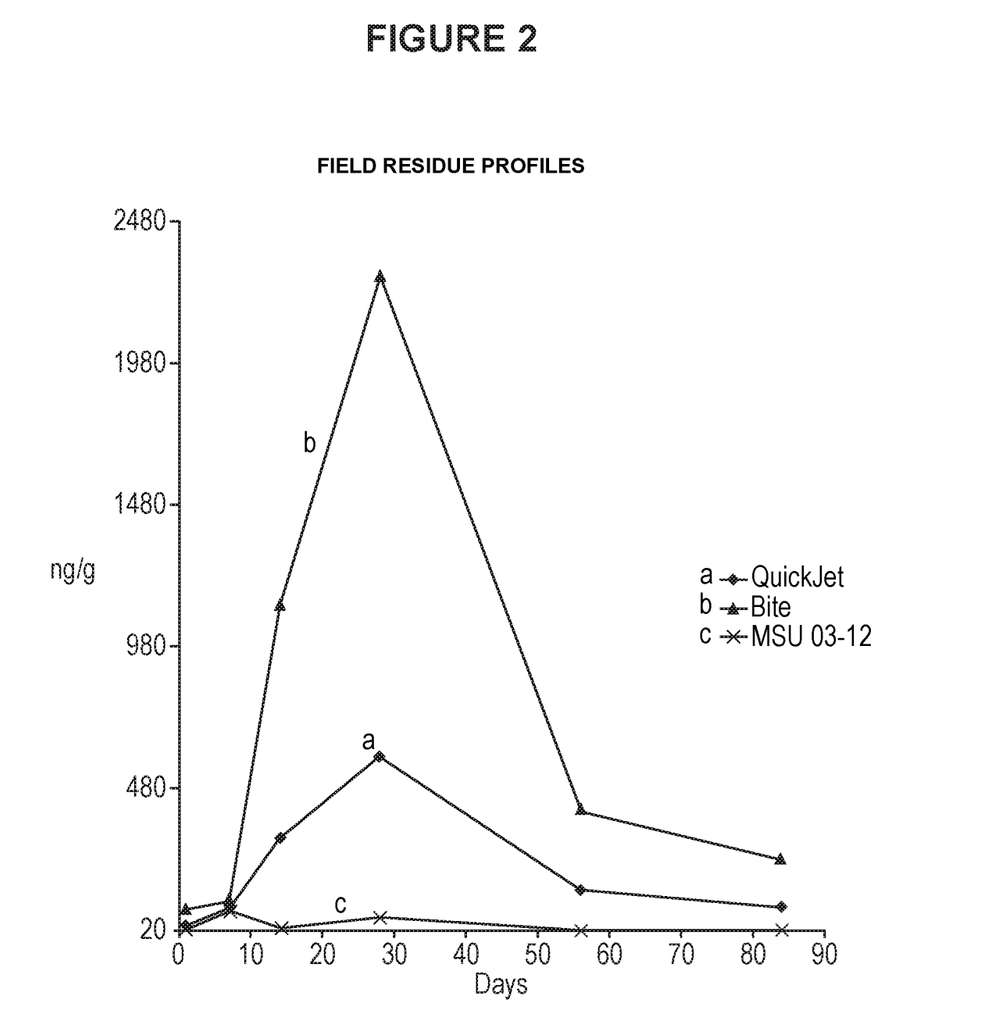
FIG. 2 includes a graph showing field residue profiles in apple trees (ng imidacloprid/g leaf material vs. days after treatment) for field tests of commercial injection techniques and the MSU 03-12 (60:40 Wood:PLA) composite pesticide plug including imidacloprid.

Field and Lab Study Results:

The field trial of the MSU 03-12 (60:40 Wood:PLA) composite pesticide plug demonstrated successful delivery of active ingredient from injection point to the tree canopy (FIG. 2). The commercial standards (QUICKJET and BITE), however, provided a higher delivery of active ingredient than the MSU 03-12 (60:40 Wood:PLA) composite pesticide plug. Further lab and field trials included several types of composite pesticide plugs including the MSU 01-15 (60:25:15 Wood:PLA:PVOH), MSU 02-13 (72.5:27.5 Wood:PLA), and MSU 01-14 (30:70 Wood:PVOH) plugs with either imidacloprid or emamectin benzoate insecticide (FIGS. 3 and 4). The lab dissipation studies for both imidacloprid and emamectin benzoate showed superior release profiles for plugs with PVOH thermoplastic polymer, although in the field trials the MSU 01-14 (30:70 Wood: PVOH) plugs were not competitive with commercial standards. In a further timing study, the MSU 01-16 (60:40 wood:PVOH) plug with emamectin benzoate injected at the tight cluster (TC) timing provided superior delivery to the canopy over the petal fall (PF) timing, and outperformed both commercial standards (FIG. 5). The MSU 01-16 (60:40 wood:PVOH) plug with imidacloprid did not show similar performance. It is believed that the TC timing of MSU 01-16 (60:40 wood:PVOH) plug with emamectin benzoate coincided with the apple tree's early season "sap flow," thus saturating the plug and allowing release of active ingredient. It is possible that the high sugar content of the early season "sap flow" allowed partitioning of the more lipophilic emamectin benzoate, whereas the hydrophilic imidacloprid remained bound in the plug.

Example 1: Sample MSU 03-12 (60:40 Wood:PLA)

Sample MSU 03-12 is composite pesticide plug (0.375 inch or 9.5 mm diameter) including a 60:40 (w/w) mixture of wood flour (pine, mesh 20) and PLA (extrusion-grade 2002D), and further including 11.1 wt. % imidacloprid relative to the combined weight of wood flour and PLA (Table 1).

TABLE 1

Composition (wt. %) of MSU 03-12 Samples (200 mg/plug Imidacloprid)

| Component | 60:40 Wood:PLA |
|---|---|
| Imidacloprid | 10.05% |
| Wood Flour | 53.97% |
| PLA | 35.98% |
| Total | 100% |

Before melt blending, the PLA and wood flour were dried at 55° C. and 105° C., respectively, for at least 24 h to remove moisture. PLA, wood flour, and imidacloprid blends were weighed based on the formulation listed in Table 1 and manually dry mixed in a kitchen blender at high intensity speed for 20 sec. The dry-mixed materials were processed into rod specimens using two different methods:

Direct Extrusion of Rod Specimens:

Dry-mixed materials were directly extruded into rods using a 32 mm conical counter-rotating twin-screw extruder (TSE) with a length-to-diameter ratio of 13:1 (C. W. Brabender Instruments Inc., South Hackensack, N.J.) fitted with a rod profile die (⅜-inch in diameter). The extruder was powered with a 5.6 kW (7.5 hp) INTELLI-TORQUE PLASTI-CORDER Torque Rheometer (C. W. Brabender Instruments Inc.). Extrusion temperature from the hopper to the die for all processing was 170-165-160-160° C. and the rotational screw maintained a constant speed at 40 rpm.

Melt Blending Prior to Extrusion of Rod Specimens:

Dry-mixed materials were melt blended prior to extrusion into rod specimens. A 7.5 hp INTELLI-TORQUE PLASTI-CORDER Torque Rheometer drive (C. W. Brabender Instruments, Inc.) was employed for melt blending using a 60 ml electrically heated three-piece internal mixer/measuring head (3:2 gear ratio) with roller style mixing blades. The tests were run at a constant mixer temperature of 190° C. for 3 min. The weight charge set at 30 g was used with all compounds and the rotor speed was held at 50 rpm. A 5 kg dead weight was put on top of the ram throughout the experiments. Once melt blended, the compounds were cooled at room temperature for about an hour and granulated in a Whiley mill to powder. Powdered compounds were then extruded into rod specimens using the conditions and method described above (Direct Extrusion of Rod Specimens).

Example 2: Sample MSU 02-13 (60:40 and 72.5:27.5 Wood:PLA)

Sample MSU 02-13 is composite pesticide plug (0.25 inch or 6.4 mm diameter) including a 60:40 (w/w) or 72.5:27.5 (w/w) mixture of wood flour (pine, mesh 20) and PLA (extrusion-grade 2002D), and further including either 29.1 wt. % imidacloprid or 2.31 wt. % emamectin benzoate relative to the combined weight of wood flour and PLA (Tables 2A and 2B).

TABLE 2A

Composition (wt. %) of MSU 02-13 Samples (200 mg/plug Imidacloprid)

| Component | 60:40 Wood:PLA | 72.5:27.5 Wood:PLA |
|---|---|---|
| Imidacloprid | 22.61% | 22.61% |
| Wood Flour | 46.43% | 56.10% |
| PLA | 30.95% | 21.28% |
| Total | 100% | 100% |

TABLE 2B

Composition (wt. %) of MSU 02-13 Samples (20 mg/plug emamectin benzoate)

| Component | 60:40 Wood:PLA | 72.5:27.5 Wood:PLA |
|---|---|---|
| Emamectin benzoate | 2.26% | 2.26% |
| Wood Flour | 58.64% | 70.86% |
| PLA | 39.10% | 26.88% |
| Total | 100% | 100% |

Each formulation listed in Tables 2A and 2B was processed by melt blending 30 g of the formulation in a 60 ml electrically heated three-piece internal mixer/measuring head (3:2 gear ratios) with roller style mixing blades (C. W. Brabender Instruments, Inc.). The mixer was driven by a 7.5 hp INTELLI-TORQUE PLASTI-CORDER Torque Rheometer (C. W. Brabender Instruments, Inc.). The mixing process was run at a constant mixer temperature of 190° C. for 3 minutes. The rotor speed used was 50 rpm and weight charge set at 30 g.

After the melt blending, the processed samples (melt blended samples) were cooled at room temperature and then granulated in a Conair WORTEX granulator (model JC-5).

The granulated samples were then extruded using a 19 mm single-screw extruder (C. W. Brabender Instruments, Inc.) with a length-to-diameter ratio of 30:1. The rotational screw speed was set at 35 rpm and a ¼" rod die was used. The extruder ran at two different processing temperature profiles: (i) 170-165-160-155° C. from hopper to ¼" rod die for imidacloprid-based plugs and (ii) 180-175-170-165° C. from hopper to ¼" rod die for emamectin benzoate-based plugs.

Example 3: Sample MSU 01-14 (30:70 Wood:PVOH)

Sample MSU 01-14 is composite pesticide plug (0.25 inch or 6.4 mm diameter and 1 inch or 25.4 mm length) including a 30:70 (w/w) mixture of wood flour (pine, mesh 20) and PVOH (extrusion- and injection molding-grade MOW IFLEX LP TC 251 available from Kuraray America, Inc.), and further including either 45.9 wt. % imidacloprid or 8.71 wt. % emamectin benzoate relative to the combined weight of wood flour and PVOH (Tables 3A and 3B).

TABLE 3A

| Composition (wt. %) of MSU 01-14 Samples (200 mg/plug Imidacloprid) ||
| --- | --- |
| Component | 30:70 Wood:PVOH |
| Imidacloprid | 31.45% |
| Wood Flour | 13.71% |
| PVOH | 54.84% |
| Total | 100% |

TABLE 3B

| Composition (wt. %) of MSU 01-14 Samples (20 mg/plug Emamectin Benzoate) ||
| --- | --- |
| Component | 30:70 Wood:PVOH |
| Emamectin Benzoate | 8.01% |
| Wood Flour | 18.4% |
| PVOH | 73.59% |
| Total | 100% |

Mixing:

Before melt blending, the PVOH and wood flour, were dried at 55° C. and 105° C., respectively to remove moisture. PVOH, wood flour, and imidacloprid or emamectin benzoate blends were weighed based on the formulation listed in Tables 3A and 3B and then manually mixed. The batch was mixed in a three-piece mixer at 30 RPM, 210° C. for 3 minutes, and then weighed out in 5-7 gram pieces of the new mixture to compress in a compression molder.

Compression Molder Conditions:

The samples (5-7 gram pieces as described above) were placed in an 18.15 cm² square mold at 355° C. The samples were molded under 1 ton compression for 1 minute, and then the press was gradually closed to a 3 ton compression for 2 more minutes. After this, the samples were allowed to anneal for 7 minutes (i.e., total of 10 minutes compression molding processing time for each sample). The compression molded samples (0.25 inch or 6.4 mm diameter) were then cut to 1 inch (or 25.4 mm) length.

Example 4: Sample MSU 01-15 (60:25:15 Wood:PLA:PVOH)

Sample MSU 01-14 is composite pesticide plug (0.25 inch or 6.4 mm diameter and 1 inch or 25.4 mm length) including a 60:25:15 (w/w) mixture of wood flour (pine, mesh 20), PLA (extrusion-grade pellets available from Filabot, Barre, Vt.), and PVOH (extrusion- and injection molding-grade MOW IFLEX LP TC 251 available from Kuraray America, Inc.), and further including 31.2 wt. % imidacloprid, 2.48 wt. % emamectin benzoate, or 31.2 wt. % phosphorous acid relative to the combined weight of wood flour, PLA, and PVOH (Tables 4A, 4B, and 4C).

TABLE 4A

| Composition (wt. %) of MSU 01-15 Samples (200 mg/plug Imidacloprid) ||
| --- | --- |
| Component | 60:25:15 Wood:PLA:PVOH |
| Imidacloprid | 23.80% |
| Wood Flour | 45.72% |
| PLA | 19.05% |
| PVOH | 11.43% |
| Total | 100% |

TABLE 4B

| Composition (wt. %) of MSU 01-15 Samples (20 mg/plug Emamectin Benzoate) ||
| --- | --- |
| Component | 60:25:15 Wood:PLA:PVOH |
| Emamectin Benzoate | 2.42% |
| Wood Flour | 58.55% |
| PLA | 24.39% |
| PVOH | 14.64% |
| Total | 100% |

TABLE 4C

| Composition (wt. %) of MSU 01-15 Samples (20 mg/plug Phosphorous Acid) ||
| --- | --- |
| Component | 60:25:15 Wood:PLA:PVOH |
| Phosphorous Acid | 23.80% |
| Wood Flour | 45.72% |
| PLA | 19.05% |
| PVOH | 11.43% |
| Total | 100% |

Mixing:

Before melt blending, the PLA, PVOH, and wood flour were dried at 55° C., 55° C., and 105° C., respectively to remove moisture. PLA, PVOH, wood flour, and imidacloprid, emamectin benzoate, or phosphorous acid blends were weighed based on the formulation listed in Tables 4A, 4B, and 4C, and then manually mixed.

Extrusion Conditions:

Samples ranging from 20-50 grams in weight were processed using a FILASTRUDER single screw extruder (available from Filabot, Barre, Vt.) with a ¼" rod die and with a temperature of 180° C. at the die. Extruded plug samples were then cut to 1 inch or 25.4 mm length.

Example 5: Sample MSU 01-16 (60:40 Wood:PVOH)

Sample MSU 01-16 is composite pesticide plug (0.25 inch or 6.4 mm diameter and 1 inch or 25.4 mm length) including a 60:40 (w/w) mixture of wood flour (pine, mesh 20) and PVOH (extrusion- and injection molding-grade MOW IFLEX LP TC 251 available from Kuraray America, Inc.), and further including either 28.5 wt. % imidacloprid or 2.89 wt. % emamectin benzoate relative to the combined weight of wood flour and PVOH (Tables 5A and 5B).

TABLE 5A

Composition (wt. %) of MSU 01-16 Samples
(200 mg/plug Imidacloprid)

| Component | 60:40 Wood:PVOH |
|---|---|
| Imidacloprid | 22.18% |
| Wood Flour | 46.69% |
| PVOH | 31.13% |
| Total | 100% |

TABLE 5B

Composition (wt. %) of MSU 01-16 Samples
(20 mg/plug Emamectin Benzoate)

| Component | 60:40 Wood:PVOH |
|---|---|
| Emamectin Benzoate | 2.81% |
| Wood Flour | 58.32% |
| PVOH | 38.88% |
| Total | 100% |

Mixing:

Before melt blending, the PVOH and wood flour were dried at 55° C. and 105° C., respectively to remove moisture. PVOH, wood flour, and imidacloprid or emamectin benzoate blends were weighed based on the formulation listed in Tables 5A and 5B, and then manually mixed.

Extrusion Conditions:

Samples ranging from 20-50 grams in weight were processed using a FILASTRUDER single screw extruder (available from Filabot, Barre, Vt.) with a ¼" rod die and with a temperature of 180° C. at the die. Extruded plug samples were then cut to 1 inch or 25.4 mm length.

Example 6: Sample MSU 03-15 (60:25:15 Wood:PLA:PVOH)

Sample MSU 03-15 is composite pesticide plug (0.125 inch or 3.2 mm diameter and 0.125 inch or 3.2 mm length) including a 60:25:15 (w/w) mixture of wood flour (pine, mesh 20), PLA (extrusion-grade pellets available from Filabot, Barre, Vt.), and PVOH (extrusion- and injection molding-grade MOW IFLEX LP TC 251 available from Kuraray America, Inc.), and further including 18.4 wt. % emamectin benzoate relative to the combined weight of wood flour, PLA, and PVOH (Table 6). The smaller plug size and lower loading of active ingredient emamectin benzoate are suitable for nursery trees.

TABLE 6

Composition (wt. %) of MSU 03-15 Samples
(10 mg/plug Emamectin Benzoate)

| Component | 60:25:15 Wood:PLA:PVOH |
|---|---|
| Emamectin Benzoate | 15.55% |
| Wood Flour | 50.67% |
| PLA | 21.11% |
| PVOH | 12.67% |
| Total | 100% |

Mixing:

Before melt blending, the PLA, PVOH, and wood flour were dried at 55° C., 55° C., and 105° C., respectively to remove moisture. PLA, PVOH, wood flour, and emamectin benzoate blends were weighed based on the formulation listed in Table 6, and then manually mixed.

Extrusion Conditions:

Samples ranging from 20-50 grams in weight were processed using a FILASTRUDER single screw extruder (available from Filabot, Barre, Vt.) with a ⅛" rod die and with a temperature of 180° C. at the die. Extruded plug samples were then cut to 0.125 inch or 3.2 mm length.

Example 7: Sample MSU 02-15 (60:25:15 Wood:PLA:PVOH)

Sample MSU 02-15 is composite pesticide plug (0.125 inch or 3.2 mm diameter and 0.125 inch or 3.2 mm length) including a 60:25:15 (w/w) mixture of wood flour (pine, mesh 20), PLA (extrusion-grade pellets available from Filabot, Barre, Vt.), and PVOH (extrusion- and injection molding-grade MOW IFLEX LP TC 251 available from Kuraray America, Inc.), and further including 18.4 wt. % phosphorous acid relative to the combined weight of wood flour, PLA, and PVOH (Table 7). The smaller plug size and lower loading of active ingredient phosphorous acid are suitable for nursery trees.

TABLE 7

Composition (wt. %) of MSU 02-15 Samples
(10 mg/plug Phosphorous Acid)

| Component | 60:25:15 Wood:PLA:PVOH |
|---|---|
| Phosphorous Acid | 15.55% |
| Wood Flour | 50.67% |
| PLA | 21.11% |
| PVOH | 12.67% |
| Total | 100% |

Mixing:

Before melt blending, the PLA, PVOH, and wood flour were dried at 55° C., 55° C., and 105° C., respectively to remove moisture. PLA, PVOH, wood flour, and phosphorous acid blends were weighed based on the formulation listed in Table 7, and then manually mixed.

Extrusion Conditions:

Samples ranging from 20-50 grams in weight were processed using a FILASTRUDER single screw extruder (available from Filabot, Barre, Vt.) with a ⅛" rod die and with a temperature of 180° C. at the die. Extruded plug samples were then cut to 0.125 inch or 3.2 mm length.

Because other modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A composite pesticide plug comprising:
   (a) a thermoplastic polymer matrix comprising:
      (a1) a water-soluble thermoplastic polymer, and
      (a2) a biodegradable thermoplastic polymer;
   (b) a cellulosic reinforcement distributed throughout the thermoplastic polymer matrix; and
   (c) a pesticide,
   wherein the composite pesticide plug has an elongate geometry, having a length of 1 mm to 100 mm and a diameter of 1 mm to 25 mm.

2. The composite pesticide plug of claim 1, wherein the biodegradable thermoplastic polymer is a biodegradable thermoplastic polyester.

3. The composite pesticide plug of claim 1, wherein the biodegradable thermoplastic polymer is selected from the group consisting of poly(lactic acid), a poly(hydroxyalkanoate), a poly(lactone), and combinations thereof.

4. The composite pesticide plug of claim 1, wherein the biodegradable thermoplastic polymer is a poly(lactic acid).

5. The composite pesticide plug of claim 1, wherein the water-soluble thermoplastic polymer is selected from the group consisting of poly(vinyl alcohol), polyacrylates, polymethacrylates, water-soluble (meth)acrylate copolymers, polyvinyl pyrrolidones, polyethyleneimines, polyalkylene oxides, polyacrylic acids and salts thereof, and combinations thereof.

6. The composite pesticide plug of claim 1, wherein the water-soluble thermoplastic polymer is a poly(vinyl alcohol).

7. The composite pesticide plug of claim 1, wherein the cellulosic reinforcement is selected from the group consisting of wood flour, wood fibers, wood chips, wood flakes, and combinations thereof.

8. The composite pesticide plug of claim 1, wherein the cellulosic reinforcement comprises wood flour.

9. The composite pesticide plug of claim 1, wherein the pesticide is selected from the group consisting of neonicotinoids, avermectins, azadirachtin, diamides, sterol inhibitors, oxytetracycline, phosphorous acid, derivatives thereof, and combinations thereof.

10. The composite pesticide plug of claim 1, wherein the pesticide has a water solubility of at least 0.1 g/L.

11. The composite pesticide plug of claim 1, wherein the pesticide has a water solubility of less than 0.1 g/L.

12. The composite pesticide plug of claim 1, wherein the biodegradable thermoplastic polymer is present in the composite pesticide plug in an amount ranging from 10 wt. % to 50 wt. % relative to the combined amount of the thermoplastic polymer matrix and the cellulosic reinforcement.

13. The composite pesticide plug of claim 1, wherein the water-soluble thermoplastic polymer is present in the composite pesticide plug in an amount ranging from 5 wt. % to 40 wt. % relative to the combined amount of the thermoplastic polymer matrix and the cellulosic reinforcement.

14. The composite pesticide plug of claim 1, wherein a weight ratio of the biodegradable thermoplastic polymer to the water-soluble thermoplastic polymer in the composite pesticide plug ranges from 1 to 3.

15. The composite pesticide plug of claim 1, wherein the cellulosic reinforcement is present in the composite pesticide plug in an amount ranging from 30 wt. % to 85 wt. % relative to the combined amount of the thermoplastic polymer matrix and the cellulosic reinforcement.

16. The composite pesticide plug of claim 1, wherein the pesticide is present in the composite pesticide plug in an amount ranging from 1 wt. % to 50 wt. % relative to the combined amount of the thermoplastic polymer matrix and the cellulosic reinforcement.

17. A composite plug for delivery of one or more plant protection materials to internal tree tissue, the composite plug comprising:
   (a) a thermoplastic polymer matrix comprising a water-soluble thermoplastic polymer;
   (b) a cellulosic reinforcement distributed throughout the thermoplastic polymer matrix; and
   (c) a plant protection material,.
   wherein the composite pesticide plug has an elongate geometry, having a length of 1 mm to 100 mm and a diameter of 1 mm to 25 mm, and
   the composite plug is free from a coating.

18. The composite plug of claim 17, wherein the thermoplastic polymer matrix further comprises a biodegradable thermoplastic polymer.

19. The composite plug of claim 17, wherein the plant protection material is selected from the group consisting of pesticides, biopesticides, plant growth regulators, fertilizers, and combinations thereof.

20. A composite pesticide plug comprising:
   (a) a thermoplastic polymer matrix as a continuous phase for the composite pesticide plug, the thermoplastic polymer matrix comprising:
      (a1) a water-soluble thermoplastic polymer comprising poly(vinyl alcohol), and
      (a2) a biodegradable thermoplastic polymer comprising poly(lactic acid);

(b) a cellulosic reinforcement distributed throughout the thermoplastic polymer matrix, the cellulosic reinforcement comprising wood flour; and (c) a pesticide;

wherein:

(i) the biodegradable thermoplastic polymer is present in the composite pesticide plug in an amount ranging from 15 wt. % to 40 wt. % relative to the combined amount of the thermoplastic polymer matrix and the cellulosic reinforcement;

(ii) the water-soluble thermoplastic polymer is present in the composite pesticide plug in an amount ranging from 5 wt. % to 25 wt. % relative to the combined amount of the thermoplastic polymer matrix and the cellulosic reinforcement;

(iii) a weight ratio of the biodegradable thermoplastic polymer to the water-soluble thermoplastic polymer in the composite pesticide plug ranges from 1.2 to 2.5;

(iv) the cellulosic reinforcement is present in the composite pesticide plug in an amount ranging from 40 wt. % to 80 wt. % relative to the combined amount of the thermoplastic polymer matrix and the cellulosic reinforcement;

(v) the pesticide is present in the composite pesticide plug in an amount ranging from 1 wt. % to 50 wt. % relative to the combined amount of the thermoplastic polymer matrix and the cellulosic reinforcement; and (vi) the composite pesticide plug has an elongate geometry, having a length of 1 mm to 100 mm and a diameter of 1 mm to 25 mm.

21. A method for delivering a pesticide to a tree, the method comprising:

inserting the composite pesticide plug of claim 1 into an interior trunk region of a live tree.

22. The method of claim 21, comprising inserting the composite pesticide plug at a height ranging from 0.1 m to 1 m above the ground.

23. The method of claim 21, comprising inserting a plurality of the composite pesticide plugs at multiple positions distributed circumferentially around the tree trunk.

24. The method of claim 21, wherein the tree is a fruit tree selected from the group consisting of apple trees, cherry trees, grapefruit trees, lemon trees, lime trees, nectarine trees, orange trees, peach trees, pear trees, plum trees, and pomegranate trees.

25. The composite pesticide plug of claim 1, wherein the composite pesticide plug is free from a coating.

* * * * *